US011522734B2

(12) United States Patent
Lin et al.

(10) Patent No.: US 11,522,734 B2
(45) Date of Patent: Dec. 6, 2022

(54) METHOD FOR CONTROLLING A REMOTE SERVICE ACCESS PATH AND RELEVANT DEVICE

(71) Applicant: GUANGZHOU HUADUO NETWORK TECHNOLOGY CO., LTD., Guangdong (CN)

(72) Inventors: Minggui Lin, Guangdong (CN); Tao Zhang, Guangdong (CN); Zhengxian Lin, Guangdong (CN); Xun Feng, Guangdong (CN); Shunwen Tan, Guangdong (CN)

(73) Assignee: GUANGZHOU HUADUO NETWORK TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 16/516,439

(22) Filed: Jul. 19, 2019

(65) Prior Publication Data
US 2019/0342117 A1 Nov. 7, 2019

Related U.S. Application Data

(63) Continuation of application No. PCT/CN2017/105020, filed on Sep. 30, 2017.

(30) Foreign Application Priority Data

Jan. 19, 2017 (CN) .......................... 201710039143.7

(51) Int. Cl.
*H04L 12/46* (2006.01)
*H04L 43/0829* (2022.01)
(Continued)

(52) U.S. Cl.
CPC ...... *H04L 12/4633* (2013.01); *H04L 43/0841* (2013.01); *H04L 43/0864* (2013.01);
(Continued)

(58) Field of Classification Search
None
See application file for complete search history.

(56) References Cited

U.S. PATENT DOCUMENTS 7,472,192 B2 * 12/2008 DeFerranti ............. H04L 12/14
709/223
7,940,685 B1 * 5/2011 Breslau ............... H04L 43/0858
709/224
(Continued)

OTHER PUBLICATIONS

Valentin et al., "A Survey of Network Isolation Solutions for Multi-Tenant Data Centers", Oct. 1, 2016, IEEE Communications Surveys & Tutorials (vol. 18, Issue: 4, pp. 2787-2821) (Year: 2016).*

*Primary Examiner* — Davoud A Zand

(57) ABSTRACT

The present invention provides a method for controlling a remote service access path including the steps of: receiving a datagram sent by any terminal intending to access the remote service; requesting a node management server to determine an optimal gateway server as an optimal node for transferring the datagram, the optimal gateway server being selected from a number of gateway servers provided for a distributed deployment architecture established for a server cluster of the remote service; testing transmission quality of a number of accessed data connections to the optimal gateway server, and determining an optimal data connection having optimal transmission quality; and invoking the optimal data connection to send a datagram after tunnel encapsulation thereof, and the optimal gateway server forwarding the datagram to a business server connected to the optimal gateway server and belonging to the server cluster.

9 Claims, 3 Drawing Sheets

(51) Int. Cl.
*H04L 43/0864* (2022.01)
*H04L 43/10* (2022.01)
*H04L 67/101* (2022.01)
*H04L 69/18* (2022.01)

(52) U.S. Cl.
CPC ............ *H04L 43/10* (2013.01); *H04L 67/101* (2013.01); *H04L 69/18* (2013.01); *H04L 2212/00* (2013.01)

(56) References Cited

U.S. PATENT DOCUMENTS

| | | | |
|---|---|---|---|
| 9,578,573 B2 * | 2/2017 | Srivastava | H04W 36/30 |
| 2003/0191841 A1 * | 10/2003 | DeFerranti | H04L 67/1036 |
| | | | 709/226 |
| 2004/0162901 A1 * | 8/2004 | Mangipudi | H04L 69/329 |
| | | | 709/225 |
| 2008/0247382 A1 * | 10/2008 | Verma | H04L 65/80 |
| | | | 370/352 |
| 2016/0014072 A1 * | 1/2016 | Mongazon-Cazavet | ................... |
| | | | H04L 47/825 |
| | | | 709/226 |
| 2017/0048789 A1 * | 2/2017 | Tan | H04W 36/30 |
| 2017/0339584 A1 * | 11/2017 | Ketonen | H04W 24/04 |

* cited by examiner

METHOD FOR CONTROLLING A REMOTE SERVICE ACCESS PATH AND RELEVANT DEVICE

CROSS REFERENCE TO RELATED APPLICATIONS

The present application is a Continuation Application of PCT Application No. PCT/CN2017/105020 filed on Sep. 30, 2017, which claims the benefit of Chinese Patent Application No. 201710039143.7 filed on Jan. 19, 2017. All the above are hereby incorporated by reference.

BACKGROUND OF THE INVENTION

Field of the Invention

The present invention generally relates to network communication and, more particularly, relates to a method for controlling a remote service access path and relevant device.

Description of the Related Art

The real-time transmission requirement of large data volume stimulates the development of internet information transmission technology, especially the transmission between single-ended and single-ended, and the reliability of information transmission is relatively high. However, when multiple ends are involved, especially connection between one end and another end via several servers is required, the reliability of information transmission is reduced greatly. The reason is mainly because the reliability of information transmission on the internet is low, i.e. the packet loss rate and delay performance of the internet communication cannot be guaranteed, especially data transmission across operators or across provinces. When establishing a remote service on such a network, the subjective feeling of the user for obtaining the remote service (for example, using audio or video service) is poor. In addition, when the user accesses the remote service through multiple services via the client end, the unilateral routing of the remote business server cluster will reduce the data transmission quality between client end and server, server and server greatly, and most optimal path cannot be really realized.

Summarizing the above, in conventional multi-data connection, technical problems relating to the transmission bottleneck of the operator, the geographical difference, the communication quality, and the routing of the server cluster of the distributed architecture cannot be avoided.

SUMMARY OF THE INVENTION

In view of the foregoing, what is needed, therefore, is to provide a method for controlling a remote service access path and relevant device, so as to overcome or at least partially solve the technical problems as previously discussed.

In order to solve the technical problem as previously discussed, the embodiments of the present invention provide the following technical solutions.

According to a first aspect of the present invention, one embodiment of the present invention provides a method for controlling a remote service access path, including the steps of:
receiving a datagram sent by any terminal intending to access the remote service;
requesting a node management server to determine an optimal gateway server as an optimal node for transferring the datagram, the optimal gateway server being selected from a plurality of gateway servers provided for a distributed deployment architecture established for a server cluster of the remote service;
testing transmission quality of a plurality of accessed data connections to the optimal gateway server, and determining an optimal data connection having optimal transmission quality; and
invoking the optimal data connection to send a datagram after tunnel encapsulation thereof, and the optimal gateway server forwarding the datagram to a business server connected to the optimal gateway server and belonging to the server cluster.

In combination with the first aspect, in a first implementation of the first aspect, after the step of invoking the optimal data connection to send a datagram after tunnel encapsulation thereof, and the optimal gateway server forwarding the datagram to a business server connected to the optimal gateway server and belonging to the server cluster, the method further comprises the steps of:
receiving the datagram forwarded by the business server via the optimal gateway server and fed back by the optimal data connection;
tunnel decapsulating the datagram tunnel encapsulated by the business server, and sending the tunnel decapsulated datagram to the terminal.

In combination with the first implementation of the first aspect, in a second implementation manner of the first aspect, the step of requesting a node management server to determine an optimal gateway server as an optimal node for transferring the datagram includes the steps of:
sending an optimal node acquisition request to the node management server, and providing address information of the device in the request; and
receiving the optimal gateway server being the optimal node for transferring the datagram feed backed by the node management server and determined according to the address information.

In combination with the first aspect, in a third implementation manner of the first aspect, the optimal gateway server determined by the node management server relative to other gateway servers in the distributed deployment architecture, or a deployment region thereof closer to the terminal, and/or channel transmission quality thereof is optimal among all gateway servers, and/or data connection thereof and the optimal data connection belonging to a same operator, is determined as an optimal node according to the above conditions.

In combination with the third implementation manner of the first aspect, in a fourth implementation manner of the first aspect, the channel transmission quality is determined according to the transmission quality determined by a round trip delay and a packet loss rate of a test packet of a transmission channel between the node management server and the gateway server.

In combination with the first aspect, in a fifth implementation manner of the first aspect, the step of testing transmission quality of a plurality of accessed data connections to the optimal gateway server, and determining an optimal data connection having optimal transmission quality includes the steps of:
invoking different data connections have been accessed one by one to send test datagram to the optimal gateway server;

obtaining test result data of each data connection, and extracting round trip delay and packet loss rate therein; and determining data connection having optimal transmission quality determined by the round trip delay and the packet loss rate as the optimal data connection.

In combination with the first aspect, in a sixth implementation manner of the first aspect, each gateway server is connected to a business server of the server cluster providing the remote service, so that the datagram after tunnel encapsulation, via the optimal gateway server, arrives at the business server connected to the optimal gateway server.

In combination with the fifth implementation manner of the first aspect, in a seventh implementation manner of the first aspect, a manner of determining the transmission quality is:

a sum of the round trip delay and the packet loss rate weighted respectively; and in the comparison of a plurality of transmission qualities, the lowest of the sum values is optima.

In combination with the sixth implementation manner of the first aspect, in the eighth implementation manner of the first aspect, a manner of determining the transmission quality is:

a sum of the round trip delay and the packet loss rate weighted respectively; and in the comparison of a plurality of transmission qualities, the lowest of the sum values is optimal.

In combination with the first aspect, in a ninth implementation manner of the first aspect, a manner of determining the transmission quality is:

a sum of the round trip delay and the packet loss rate weighted respectively; and in the comparison of a plurality of transmission qualities, the lowest of the sum values is optimal.

The datagram is a datagram conformed to a TCP or UDP protocol, and the tunnel encapsulation and the tunnel decapsulation are both performed based on the UDP protocol.

In a second aspect, one embodiment of the present invention provides a multi-data connection access device, including:

a receive module, configured to receive a datagram sent by any terminal intending to access a remote service;

a node module, configured to request a node management server to determine an optimal gateway server as an optimal node for transferring the datagram, the optimal gateway server being selected from a plurality of gateway servers provided for a distributed deployment architecture established for a server cluster of the remote service;

an optimization module, configured to test transmission quality of a plurality of accessed data connections to the optimal gateway server, and determine an optimal data connection having optimal transmission quality; and a transmission module, configured to invoke the optimal data connection to send a datagram after tunnel encapsulation thereof, and the optimal gateway server forwarding the datagram to a business server connected to the optimal gateway server and belonging to the server cluster.

Compared with the prior art, the present invention has the following advantages:

Firstly, the present invention first determines the optimal gateway node to the node management server, and then selects the optimal line matching the optimal gateway node among a plurality of local data connections, so that the overall network transmission quality is optimal and the data transmission quality is ensured.

Secondly, on the basis of ensuring the overall optimal transmission quality, the present invention transmits the tunnel encapsulated datagram, thereby ensuring safe transmission of the data and enabling the datagram between a number of data connections to run in parallel.

Thirdly, the multi-data connection access device and the method for controlling a remote service access path of the present invention can facilitates the user to access data connections of different operators, thereby providing a one-stop solution for the terminal connected to the access device to access the remote service.

In summary, the technical solution of the present invention can be implemented on a single end, thereby providing the user with independent terminal access devices, to improve the efficiency and security of users accessing specific remote services greatly.

These and other aspects of the present invention will be more apparent in view of the description of the embodiments as following.

BRIEF DESCRIPTION OF THE DRAWINGS

To illustrate the technical solutions according to embodiments of the present invention more clearly, the drawings according to the embodiments of the present invention will be described briefly below. However, it would be obvious for one ordinary skilled in the art that, the drawings only show certain embodiments of the present invention. Other drawings can also be obtained based on these drawings without any creative work.

DETAILED DESCRIPTION OF PREFERRED EMBODIMENTS

Figure 1:
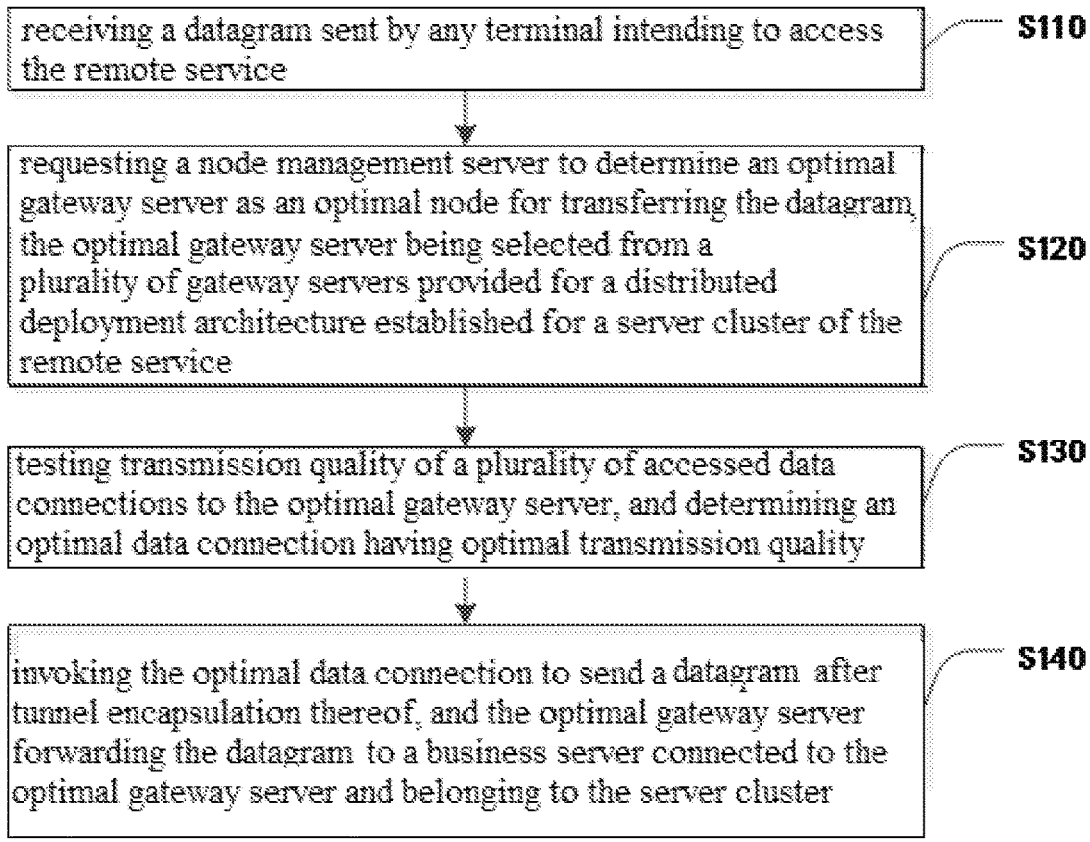
FIG. 1 is a flow chart of a method for controlling a remote service access path according to one embodiment of the present invention.

The technical solutions in accordance with embodiments of the present invention will be described clearly and completely with reference to the accompanying drawings, so that one ordinary skilled in the art can understand the present invention more easily.

The process described in the specification, the claims and the drawings of the present invention may include a number of operations in a particular order. However, it should be understood that these operations may not be carried out in the order as described in the specification or may be carried out in parallel. The serial number of the operation, such as 110, 120, is only used to distinguish different operations, the serial number itself does not represent any execution order.

In addition, these processes may include more or fewer operations, and these operations may be performed in order or in parallel. It should be noted that the terms of "first" and "second" in the present invention are used to distinguish different messages, devices, modules, not represent the order. The terms "first" and "second" do not indicate different types.

One ordinary skilled in the art should understand that the terms involved in the present invention are defined as following.

Distributed deployment architecture: Distributed is arranged to improve the efficiency via shortening the time for performing a single task, usually to improve business efficiency.

A business is divided into multiple sub-businesses and arranged on one or more independent servers in different regions. The server cluster in the present invention refers to the server cluster composed of servers distributed in different regions in the distributed deployment architecture.

Server cluster: The server cluster improves the efficiency by increasing the number of tasks performed per unit time. More particularly, server cluster refers to a number of high performance microcomputers connected to each other through commercial network switches, and have independent operating systems, motherboards, memories, hard disks and other I/O devices, to form the compute node of the server cluster. Popularly speaking, a number of servers are connected through a fast communication link. From the outside, these servers work like a server. From inside, the external load is dynamically allocated to these nodes via a certain mechanism. For example, one or more business servers in the service cluster are respectively used in remote service of pushing the video stream, thereby achieving the high performance and high availability of a super server. In distributed deployment architecture, a server cluster can be used to provide large services consisting of multiple sub-service related servers.

Business Server: Business server can be understood herein as the server for processing independent sub-services in the aforementioned distributed deployment architecture. Thus, the business server is a specially designed hardware and software platform to meet the network requirements of the business. The business server can improve the productivity or efficiency of the production line, thereby reducing the hardware and software cost of the computer. Business servers can allow computers to be placed in network and shared applications, files and data storages. Business servers can also be used to improve the security of the computer data and make the communication between the computer and the outside world much safer. For example, with the business server, the remote service, such as a video stream, can be stably and continuously transmitted to the client, and the client can watch the instant continuous content without waiting for the entire content to be transmitted.

Gateway server: Gateway is also called inter-network connector and protocol converter. The default gateway realizes network interconnection on the network layer. It is a relatively complex network interconnection device and is only used for interconnecting two networks with different high-level protocols. The structure of a gateway is similar to that of a router, except for the different interconnection layer. The gateway can be used for both WAN interconnection and LAN interconnection. The gateway is a computer system or device that undertakes a conversion task. In essence, the gateway is an IP address that the network leads to other networks. For example, there are network A and network B. The IP address range of network A is "192.168.1.1-192.168.1.254", and the subnet mask of network A is "255.255.255.0". "The IP address range of network B is "192.168.2.1-192.168.2.254" and the subnet mask of network B is "255.255.255.0". In the absence of a router, TCP/IP communication is not possible between the two networks. Even if the two networks are connected to a same switch or hub, the TCP/IP protocol will determine that the hosts in the two networks are in different networks according to the subnet mask (255.255.255.0). To achieve communication between the two networks, a gateway is needed. If the host in network A finds that the destination host of the datagram is not in the local network, the datagram is forwarded to its own gateway, and then the gateway forwards the datagram to the gateway of network B, and the gateway of network B forwards it to some host in network B. This is the process of forwarding datagram from network A to network B. In the distributed deployment architecture according to the present invention, the business servers distributed in different regions need to be equipped with independent gateway servers, so as to access to the internet via the gateway server, realize interconnection with the external network, and enable the business server to provide remote services.

Node management server: The node management server is a concept relative to the server cluster. In a multi-server domain, one server must be uniquely designated as the primary server and the other servers act as the controlled server. Each controlled server in the domain exists as a node or a node server, and the primary server in each domain is called as a node management server. Popularly speaking, a set node management server has a table that recording the correspondence of the gateway (IP) server, location, access operator, packet loss rate and round trip delay of each business server in the service cluster (the packet loss rate and round trip delay can determine the channel transmission quality). When the IP address information submitted by the multipath access device is received, the address of the multipath access device is determined, and the relevant policy is determined to find the corresponding gateway.

The technical solutions in the embodiments of the present invention will be clearly and completely described with reference to the accompanying drawings. Obviously, only a part of the embodiments, not all embodiments, of the present invention are described. All other embodiments obtained by one ordinary skilled in the art according to the embodiments of the present invention without creative efforts are within the scope of the present invention.

Referring to FIG. 1, a method for controlling a remote service access path according to one embodiment of the present invention includes the steps of:

S110: receiving a datagram sent by any terminal intending to access a remote service.

The any terminal may be a terminal device, such as a mobile phone terminal, a pad or a PC terminal, and the any terminal sends a datagram for requesting to establish a remote service. Remote service refers to real-time service between different regions by means of communication. In the present invention, the remote service refers to an internet service based on the TCP/IP protocol, such as a network broadcast service, a data download service or an instant communication service. For example, in a distributed architecture, one or more business servers in a server cluster are used in a remote service of pushing video streams.

It is well known to one ordinary skilled in the art that the TCP Protocol (Transmission Control Protocol) is a connection-oriented, reliable, and byte stream-based transport layer communication protocol. Connection-oriented means two applications that use TCP (usually a client and a server) must establish a TCP connection before exchanging datagram with one another. The UDP protocol (User Datagram Protocol) is a connectionless transport layer communication protocol in an OSI (Open System Interconnection) reference model, providing a simple transaction-oriented unreliable information transfer service. In addition, the UDP protocol retains its own data transmission channel by using different port numbers, to implement support for simultaneously sending and receiving data for a number of applications at the same time. The data sender (client end or server end) sends the UDP datagram via the source port, while the data receiver receives the data via the destination port.

Different from the TCP protocol, the UDP protocol does not require three handshakes and four disconnections, and the transmission speed of the UDP protocol is much faster relative to that of the TCP protocol. The UDP protocol even does not require a response. Therefore, preferably, the present invention uses the UDP protocol for data transmission.

Datagram is the unit of network transmission. During transmission, the datagram are continuously encapsulated as groups, packets and frames. Generally, the way to encapsulate is to add some information segments, i.e. the data organized in a certain format in the packet header, such as the information of the type of the packet, the version of the packet, the length of the packet, the entity of the packet. Decapsulation is the reverse process of encapsulation, which includes disassembling the protocol packet, processing the information in the packet header, and retrieving the original datagram. In the present invention, the datagram is a datagram conformed to the TCP or UDP protocol, such as a video stream generated by a live broadcast service. For the datagram sent by a source, the present invention further performs tunnel encapsulation process. Correspondingly, the tunnel encapsulated datagram is tunnel decapsulated to obtain the original packet, as further described herein.

The method of the present invention is suitable for implementation in an independent access device. The access device is capable of accessing multi-data connections, may belong to different or identical operators, and can provide known terminal access methods, such as WiFi and twisted pair. The access device can process data of multiple terminals accessed through different interfaces. For example, the device creates a cached data set for each accessed client. The latest data information of the client's requirements for the remote service is stored in the cached data set, so that the device can quickly obtain the latest data information according to the cached data set and process remote service requirements timely according to the latest data information.

S120: requesting a node management server to determine an optimal gateway server as an optimal node for transferring the datagram, the optimal gateway server being selected from a plurality of gateway servers provided for a distributed deployment architecture established for a server cluster of the remote service.

The multiple gateway servers assigned to the distributed deployment architecture built by the server cluster of the remote service refers to a number of gateway servers distributed in different regions and performing the same type of service (remote service). For example, Table 1 shows the distribution locations of multiple gateway servers.

TABLE 1

| Distribution locations of multiple gateway servers | |
|---|---|
| Location of the gateway server | Operator |
| Guangzhou | China Mobile |
| Shanghai | China Telecom, China Unicom |
| Wuhan | China Mobile, China Telecom |
| Chongqing | China Guangtong |
| Beijing | China Netcom |
| Qingdao | China Telecom, China Guangtong, China Unicom |
| Shenzhen | China Mobile, China Telecom |
| ... | ... |

It can be seen from Table 1 that gateways distributed in different regions may use different operator data connections, or gateways distributed in different regions may use a same operator data connection. One gateway generally uses one operator data connection, or gateways in some regions use multi-data connections of different operators.

Specifically, the step of requesting a node management server to determine an optimal gateway server as an optimal node for transferring the datagram includes the steps of:

sending an optimal node acquisition request to the node management server, and providing address information of the device in the request;

For example, if the device is in Changsha, the optimal node acquisition request is sent to the node management server, and the IP address of the device is included in the request. For example, the IP address of the space location in Changsha, and the IP address is used as the device address information. An IP address is a unified address format provided by the IP protocol which assigns a logical address to each network and each host on the internet, so as to shield the difference in physical addresses.

receiving the optimal gateway server being the optimal node for transferring the datagram feed backed by the node management server and determined according to the address information.

Preferably, the optimal gateway server determined by the node management server relative to other gateway servers in the distributed deployment architecture, or a deployment region thereof closer to the terminal, and/or channel transmission quality thereof is optimal among all gateway servers, and/or data connection thereof and the optimal data connection belonging to a same operator, is determined as an optimal node according to the above conditions.

For example, in the foregoing example, after the local access device submits its own IP address to the node management server, the node management server can determine its specific geographical location via the IP address, such as Changsha as described in the foregoing example.

Then, the node management server can determine the optimal gateway server with reference to the conditions shown in Table 2 on the basis of Table 1.

TABLE 2

| Conditions that the optimal gateway server satisfies with respect to other gateway servers in the distributed deployment architecture | |
|---|---|
| Conditions for determining the optimal node | Deployment region closer to Changsha |
| | Optimal channel transmission quality in all gateway servers |
| | Data connection of the access device and the data connection of the gateway server belong to a same operator |

TABLE 2-continued

Conditions that the optimal gateway server satisfies with respect to
other gateway servers in the distributed deployment architecture Deployment region closer to Changsha;
Optimal channel transmission quality in all gateway servers
Deployment region closer to Changsha;
Data connection of the access device and the data connection of the gateway server belong to a same operator
Optimal channel transmission quality in all gateway servers;
Data connection of the access device and the data connection of the gateway server belong to a same operator
Deployment region closer to Changsha;
Optimal channel transmission quality in all gateway servers;
Data connection of the access device and the data connection of the gateway server belong to a same operator When the location of the device determined by the IP address is in Changsha, the location of the optimal gateway server is determined as shown in Table 3.

TABLE 3

Location of the optimal gateway server located in Changsha and having the terminal operator China Mobile

| Location of the optimal gateway server | Operator | Conditions to be met |
| --- | --- | --- |
| Guangzhou | China Mobile | Same operator |
| Wuhan | China Mobile, China Telecom | Same operator, closest geographical region |
| Beijing | China Netcom | Optimal channel transmission quality |
| Shenzhen | China Mobile | Same operator |

In the foregoing example, whether the node management server determines that the data connection of the access device and the data connection adopted by the gateway server belong to a same operator depends on whether the access device reports the data connection it uses to the node management server when the optimal node acquisition request is initiated. Therefore, it can be considered optional.

Further, the node management server provides two examples for the calculation of the channel transmission quality. First, the node management server actively tests each gateway server to obtain its respective packet loss rate and round trip time according to the method of the subsequent step of S133. Second, each business server uses a similar method or means to test the node management server to obtain the packet loss rate and round trip delay, and submits the results to the node management server for storage.

In view of the foregoing, the channel transmission quality is determined according to the transmission quality determined by the round trip delay and the packet loss rate of the test datagram of the transmission channel between the node management server and the gateway server. Thus, the node management server can determine the channel transmission quality of each gateway server by querying the information such as the round trip delay and the packet loss rate of the gateway server corresponding to each business server.

It should be noted that, for the purpose of transmission, the business server needs to register information with the node management server in advance, and the registration information includes a gateway, an IP address (to determine the address information of the client), an access operator, a packet loss rate, and a round trip delay. The calculation of the channel transmission quality is obtained by testing the packet loss rate and round trip delay of each gateway server by the node management server.

It should be appreciated by one ordinary skilled in the art that:

Round trip time (RTT) refers to an important performance indicator in a computer network, indicating the total delay experienced from the sender sends the data to the sender receives the confirmation from the receiver (The confirmation is sent immediately after the receiver receives the data).

Package loss rate refers to the ratio of the number of lost packets in the test to the transmitted data set.

According to a preferable embodiment of the present invention, a manner of determining the transmission quality is:

a sum of the round trip delay and the packet loss rate weighted respectively; and in the comparison of a plurality of transmission qualities, the lowest of the sum values is optimal.

The weight score indicates the quantitative distribution of the importance of different aspects of the object to be evaluated in the evaluation process, the role of each evaluation factor in the overall evaluation is treated differently. The weight of an indicator refers to the relative importance of the indicator in the overall evaluation. After determining the system indicators, it is necessary to determine the impact of each indicator in the architecture, i.e. the weight of each indicator.

Certainly, different weight of the round trip delay and the packet loss rate has different effect on the relative importance of different transmission quality evaluation result. For example, the weight of the round trip delay is X ($1<X<1$), the weight of the packet loss rate is Y ($1<Y<100$), and $100X+Y=1$. If the value of $100X/Y$ is large, it means the round trip delay in the evaluation model has more effect on the transmission quality. Otherwise, it means that the packet loss rate is more important for the evaluation of the transmission quality. Certainly, if the value of $100X/Y$ is close to or equal to 1, it means that the evaluation model has relatively high requirements for packet loss rate and round trip delay.

For example, the device terminal address is in Changsha, and the sum of the respectively weighted round trip delay and the packet loss rate is X* round trip delay+Y* packet loss rate. The weighted value of the round trip delay $X=0.2$ and the weighted value of the packet loss rate $Y=80$, the weighted sum value is shown in Table 4.

TABLE 4

Sum of respectively weighted round trip delay and packet loss rate

| Location of optimal gateway server | operator | round trip delay (s) | packet loss rate (%) | Weighted sum | Optimal transmission quality rating (The larger the serial number, the lower the level) |
| --- | --- | --- | --- | --- | --- |
| Guangzhou | China Mobile | 90 | 10 | 26 | 3 |
| Wuhan | China Mobile | 40 | 8 | 14.4 | 1 |
| | China | 60 | 15 | 24 | 2 |

TABLE 4-continued

Sum of respectively weighted round trip delay and packet loss rate

| Location of optimal gateway server | operator | round trip delay (s) | packet loss rate (%) | Weighted sum | Optimal transmission quality rating (The larger the serial number, the lower the level) |
|---|---|---|---|---|---|
| Beijing | China Telecom Netcom | 120 | 15 | 36 | 5 |
| Shenzhen | China Mobile | 100 | 14 | 31.2 | 4 |

In the comparison of the above five transmission qualities, the effect of the packet loss rate on the channel quality is emphasized and the lowest weighted sum of Wuhan is optimal.

For example, the device terminal address is in Changsha, the sum of the respectively weighted round trip delay and the packet loss rate is X* round trip delay+Y* packet loss rate. The weighted value of the round trip delay X=0.7 and the weighted value of the packet loss rate Y=30, the weighted sum value is shown in Table 5.

TABLE 5

Sum of respectively weighted round trip delay and packet loss rate

| Location of optimal gateway server | operator | round trip delay (s) | packet loss rate (%) | Weighted sum | Optimal transmission quality rating (The larger the serial number, the lower the level) |
|---|---|---|---|---|---|
| Guangzhou | China Mobile | 90 | 10 | 66 | 3 |
| Wuhan | China Mobile | 40 | 8 | 30.4 | 1 |
|  | China Telecom | 60 | 15 | 46.5 | 2 |
| Beijing | China Netcom | 120 | 15 | 88.5 | 5 |
| Shenzhen | China Mobile | 100 | 14 | 74.2 | 4 |

In the comparison of the above five transmission qualities, the effect of the round trip delay on the channel quality is emphasized, and the lowest weighted sum of Wuhan is optimal.

It should be noted that, in the above two tables, the sum of the respectively weighted round trip delay and the packet loss rate of Wuhan is the lowest and optimal, because the round trip delay and packet loss rate in Wuhan is relatively low, and Wuhan's deployment region is closer to Changsha than other optimal gateway servers adapted to Changsha. In particular, the data connection of the access device and the data connection of the gateway server belong to the same operator (China Mobile).

Certainly, one ordinary skilled in the art should know that this the present embodiment only shows a calculation rule for determining the transmission quality, and there are still other similar or alternative calculation rules. In particularly, in the actual demand, there are other factors affecting the transmission quality, the transmission quality shall be analyzed according to the specific circumstances.

S130: testing transmission quality of a plurality of accessed data connections to the optimal gateway server, and determining an optimal data connection having optimal transmission quality.

As feedback, the foregoing node management server will feed back the optimal gateway server to the access device. Generally, the node management server only needs to return a single optimal gateway server (returning by IP address). Certainly, it can also return a list of optimal gateway servers, including a number of relatively optimal gateway servers, and then uniformly tested and selected by the access device.

Figure 2:
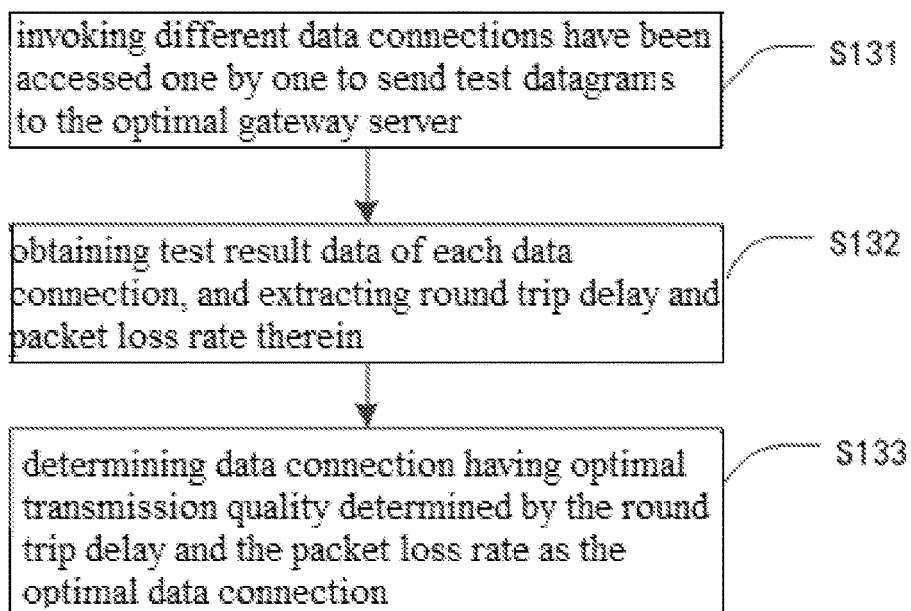
FIG. 2 is a flow chart showing an optimal data connection for determining an optimal transmission quality according to one embodiment of the present invention.

The number and form of the optimal gateway server returned by the node management server does not affect the implementation of the present invention. Referring to FIG. 2, for each optimal gateway server recommended by the node management server, it is necessary to respectively test the transmission quality of multi-data connections that the accessed access device to reach the optimal gateway server, thereby determining the optimal data connection having the optimal transmission quality. The process includes the following steps:

S131: invoking different data connections have been accessed one by one to send test datagram to the optimal gateway server;

The test data includes a test message. In performing a test, the relevant communication interface is invoked to transmit the test datagram to the optimal network management server via different accessed data connections, to obtain test results of each data connection. The test result at least includes the round trip delay and the packet loss rate.

For example, when the data connection accessed by the access device is a data connection established by the operator of China Mobile, China Telecom, China Unicom or even other operators, the test datagram is respectively sent to the determined optimal gateway server via the data connections, to obtain the test results via the data connection, as shown in Table 6:

TABLE 6

Sending test datagram to the determined optimal gateway server through the data connection of the access device

| Serial number | Location of the access device | Data connection established based on different operators | Content in the test results |
|---|---|---|---|
| 1 | Changsha | China Mobile | At least includes round trip delay and packet loss rate |
| 2 |  | China Telecom |  |
| 3 |  | China Unicom |  |

As shown in Table 6, it is known that the data connection accessed by the access device is the data connection respectively established by the operator China Mobile, China Unicorn and China Telecom, and the test datagram is sent to the determined optimal gateway server via the three data connections, to obtain the test result at least including the round trip delay and the packet loss rate. Certainly, the access device may have a number of accessed data connections, which are not limited to the three data connections as listed in Table 6.

It should be noted by one ordinary skilled in the art that the serial numbers in Table 6 are only for the purpose of explanation, and are not actual test sequences.

S132: obtaining test result data of each data connection and extracting round trip delay and packet loss rate therein;

The transmission quality evaluation model provided by the present invention utilizes round trip delay (RTT) and packet loss rate as evaluation parameters, so as to ensure that the optimal data connection has the highest video streaming transmission quality to ensure data transmission rate and quality, reduce data retransmission, reduce network load as well as improve the experience of the accessing client users. In the actual network situation, the two-parameter evaluation using the packet loss rate and the round trip delay to evaluate the transmission quality has more accurate evaluation results than single-parameter evaluation using the packet loss rate or the round trip delay alone.

S133: determining data connection having optimal transmission quality determined by the round trip delay and the packet loss rate as the optimal data connection.

For example, using the weighting calculation rule for the round trip delay and the packet loss rate in step S120, setting the weighting value of round trip delay and the packet loss rate for evaluating the optimal data connection are X=0.5 and Y=50, respectively. The sum of the round trip delay and the packet loss rate and the weighted sum of the test results are shown in Table 8.

TABLE 8

Sending test packets to the determined optimal gateway server through the data connection of the access device.

| Serial number | Location of the access device | Data connection established based on different operators | round trip delay (s) | packet loss rate (%) | Weighted sum | Optimal transmission quality rating (The larger the serial number, the lower the level) |
|---|---|---|---|---|---|---|
| 1 | Changsha | China Mobile | 15 | 5 | 10 | 2 |
| 2 | | China Telecom | 12 | 4 | 8 | 1 |
| 3 | | China Unicom | 18 | 3 | 10.5 | 3 |

Figures 5, 6:
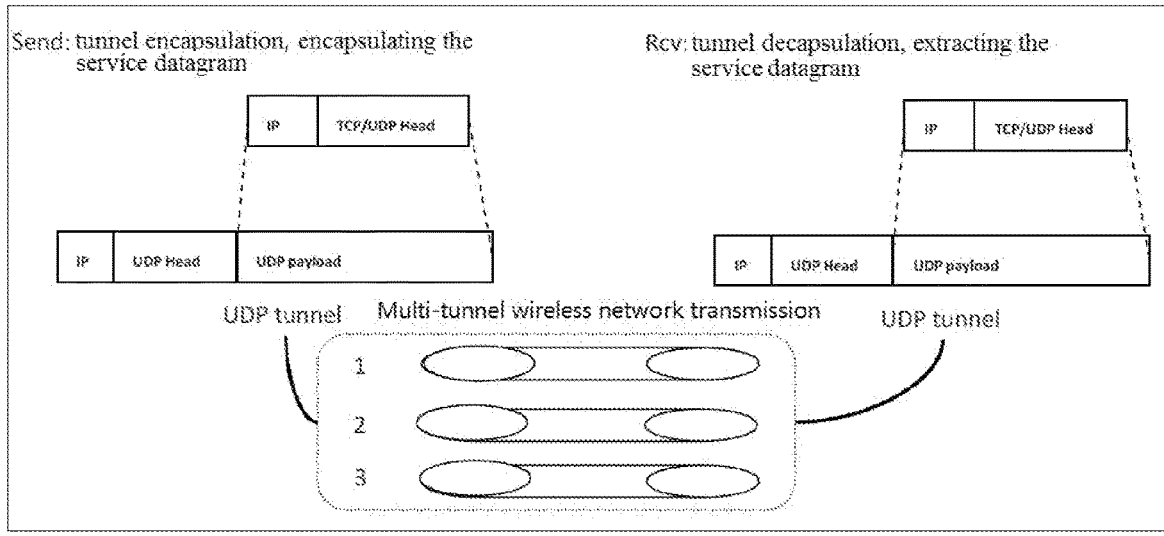
FIG. 5 shows tunnel encapsulation and tunnel decapsulation process of datagram according to one embodiment of the present invention.
FIG. 6 is a diagram showing obtaining a round trip delay and a packet loss rate of a network transmission process by using an instruction according to one embodiment of the present invention.

In actual test, there may be more than one test datagram sent by one data connection, so there are multi-data records. That is, there are multiple round trip delays and packet loss rates, and multiple extracted values of round trip delay and packet loss rate. Therefore, choosing a reasonable value is especially critical. Take ping a web address (www.YY.com) for example, as shown in FIG. 6, it can be seen that there are multiple test datagram sent, and multiple RTTs acquired. The figure shows the maximum value, minimum value and mean value of RTT. Certainly, more methods can be used in actual tests to obtain more or more relevant values, this is just an example. For the three different RTTs in FIG. 6, Table 7 shows the reasons of valuing.

TABLE 7

Comparison of value methods and reasons

| value method | Value (ms) | value reason |
|---|---|---|
| maximum value | 57 | Channel transmission quality is extremely poor, not selected |
| minimum value | 7 | Maximize implementing of the transmission mechanism, the channel transmission quality is excellent, meeting the experimental expectation |
| mean value | 23 | Reasonable balance of network resources, preferable choice in the test |

As shown in Table 7, when the maximum RTT is taken, the channel transmission quality is extremely poor, and basically will not be selected in actual application. The minimum RRT value indicates that the channel transmission quality is excellent, and the transmission mechanism is maximized, which can meet the experimental expectation. The mean value indicates a reasonable balance of network resources in actual use, which is the preferable choice in test. In addition, in actual use, the probability of occurrence of the maximum value and the minimum value is extremely small, which does not meet the actual requirement. The mean value can reflect a normal state, that is, the mean value is close to the actual measured value and can reduce the error.

As shown in Table 8, invoking the access device and using the data connection of the operator China Telecom obtains the best measured transmission quality, invoking the access device and using the data connection of the operator China Mobile obtains a better measured transmission quality, invoking the access device and using the data connection of the operator China Unicom obtains the worse measured transmission quality relative to those of China Telecom and China Mobile. Therefore, it is determined that the data connection when the access device uses the operator of China Telecom as the optimal data connection of the access device.

It should be noted that if the node management server feeds back to the access device a list of optimal gateway servers, including a number of relatively optimal gateway servers, the above principles can also be used. Each gateway server in the list invokes different data connections for testing, and the final unique optimal gateway server and a corresponding optimal data connection are determined in the results. It would be obvious to one ordinary skilled in the art.

S140: invoking the optimal data connection to send a datagram after tunnel encapsulation thereof, and the optimal gateway server forwarding the datagram to a business server connected to the optimal gateway server and belonging to the server cluster.

When a datagram is transmitted between different devices or servers via a network, to transmit the datagram to the destination reliably and accurately, and to efficiently utilize transmission resources (transmission device and transmission lines), the datagram is divided and packaged in advance. To ensure the security and reliability of the data transmission, in the present invention, when the datagram of a certain terminal is transmitted, since the access device has determined the optimal data connection according to the above steps, the optimal data connection may be used for the datagram transmission of the terminal. In order to further improve the security of the data transmission, the datagram is transmitted via tunnel encapsulation and further transmitted to a corresponding business server through the corresponding optimal gateway server.

As shown in FIG. 5, the datagram sent by the terminal is a datagram conformed to TCP or UDP protocol. For example, the video stream generated in live broadcast service needs to respond quickly and ensure the security of the video data transmission. Therefore, the datagram is transmitted under the UDP protocol. In the transmission process, the datagram needs to be encapsulated. After the data arrives, UDP protocol is used to encapsulate the data in the transmission layer and add the UDP header. The encapsulated UDP data is transmitted to the network layer, the network layer is encapsulated and added IP header according to the IP protocol. In decapsulating, when the data is transmitted from network layer to the transport layer, network layer decapsulation using IP protocol is carried out and the IP header is removed. After being transmitted from the transport layer to the terminal, UDP protocol is used to decapsulate the data and removes the UDP header.

Certainly, the above description is only a single tunnel for the optimal data connection transmission of one terminal datagram. When other terminals access, the optimal data connection is determined for each terminal according to S110 to S140 and a multi-tunnel transmission is performed.

According to a preferable embodiment of the present invention, each gateway server is connected to a business server of a server cluster providing the remote service, so that the tunnel encapsulated datagram reaches the business server connected thereto through the optimal gateway server.

For example, it can be seen from the above steps or examples, after determining the optimal data connection and performing tunnel encapsulation, the optimal gateway server of the server cluster providing the remote service is in Wuhan, and the optimal gateway server is connected to a business server with determined optimal data connection and associated with the optimal gateway server, so that the datagram related to the remote service request arrives at the business server via the optimal gateway server after the tunnel decapsulation.

Further, after step S140, the method according to the present invention further includes the following steps:

receiving the datagram forwarded by the business server via the optimal gateway server and fed back by the optimal data connection;

Specifically, after receiving the datagram tunnel encapsulated by the access device, the business server tunnel decapsulates the datagram, parses the datagram, responds to the datagram, and feeds back another tunnel decapsulated datagram. The tunnel decapsulated datagram fed back by the business server will be reversed via the optimal gateway server, and fed back to the access device via the optimal data connection for forwarding to a corresponding user terminal.

Then, the access device can tunnel decapsulates the datagram tunnel encapsulated by the business server, and send the tunnel decapsulated datagram to the terminal.

After the steps S110 to S140, the terminal requests the remote service, the datagram after the tunnel encapsulation is sent to the business server to be tunnel decapsulated, the business server returns the datagram and performs tunnel encapsulation. After arriving at the terminal, the datagram is tunnel decapsulated.

For example, the terminal is in Changsha, and the optimal gateway server is in Wuhan. When the business server connected to the optimal gateway server in the optimal data connection receives the datagram of the terminal tunnel encapsulation (remote service request) and performs tunnel decapsulation process. After providing the remote service, the datagram is optimally connected and tunnel encapsulated, and further transmitted to the terminal in Changsha by the optimal gateway server in Wuhan. After arriving at the terminal, tunnel decapsulation process of the datagram is performed.

In view of the description regarding the method for controlling a remote service access path according to the present invention, it can be seen that:

Firstly, the present invention first determines the optimal gateway node to the node management server, and then selects the optimal line matching the optimal gateway node among the plurality of local data connections, so that the overall network transmission quality is optimal and the data transmission quality is ensured.

Secondly, on the basis of ensuring the overall optimal transmission quality, the present invention transmits the tunnel encapsulated datagram, thereby ensuring the safe transmission of the data and enabling the datagram between a number of data connections to run in parallel.

Figure 3:
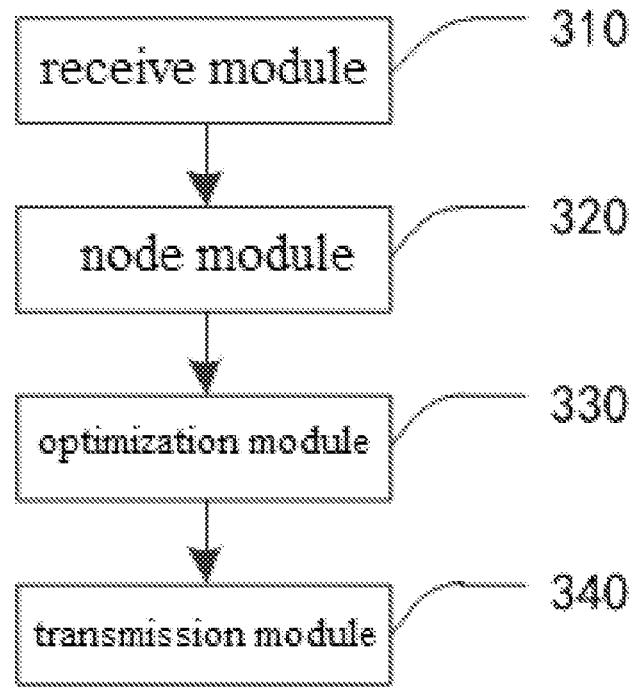
FIG. 3 is a schematic structural diagram of a multi-data connection access device according to one embodiment of the present invention.

Referring to FIG. 3, one embodiment of the present invention provides a multi-data connection access device including:

a receive module 310, configured to receive a datagram sent by any terminal intending to access a remote service.

The any terminal may be a terminal device, such as a mobile phone terminal, a pad or a PC terminal, and the any terminal sends a datagram for requesting to establish a remote service. Remote service refers to real-time service between different areas by means of communication. In the present invention, the remote service refers to an internet service based on the TCP/IP protocol, such as a network broadcast service, a data download service or an instant communication service. For example, in a distributed architecture, one or more business servers in a server cluster are used in a remote service of pushing video streams.

Datagram is the unit of network transmission. During transmission, the datagram is continuously encapsulated as groups, packets and frames. Generally, the way to encapsulate is to add some information segments, i.e. the data organized in a certain format in the packet header, such as the information of the type of the packet, the version of the packet, the length of the packet, the entity of the packet. Decapsulation is the reverse process of encapsulation, which includes disassembling the protocol packet, processing the information in the packet header, and retrieving the original datagram. In the present invention, to ensure data transmission using UDP protocol, the datagram is a datagram conformed to the TCP or UDP protocol, such as a video stream generated by a live broadcast service. For the datagram sent by a source, the present invention further performs tunnel encapsulation processing. Correspondingly, the tunnel encapsulated datagram is tunnel decapsulated to obtain the original packet, as further described herein.

The device of the present invention may be an independent access device. The access device is capable of accessing multi-data connections, may belong to different or identical operators, and can provide known terminal access methods, such as WiFi and twisted pair. The access device can process data of multiple terminals accessed through different interfaces. For example, the device creates a cached data set for each accessed client. The latest data information of the client's requirements for the remote service is stored in the cached data set, so that the device can quickly obtain the latest data information according to the cached data set and process remote service requirements timely according to the latest data information.

a node module 320, configured to request a node management server to determine an optimal gateway server as an optimal node for transferring the datagram, the optimal gateway server being selected from a plurality of gateway servers provided for a distributed deployment architecture established for a server cluster of the remote service;

The multiple gateway servers assigned to the distributed deployment architecture built by the service cluster of the remote service refers to a number of gateway servers distributed in different regions and performing the same type of service (remote service). For example, Table 1 shows the distribution locations of multiple gateway servers. It can be seen from Table 1 that gateways distributed in different regions may use different operator data connections, or gateways distributed in different regions may use a same operator data connection. One gateway generally uses one operator data connection, or gateways in some regions use multi-data connections of different operators.

Specifically, the node module 320 requests a node management server to determine an optimal gateway server as an optimal node for transferring the datagram includes:

The node module 320 sends an optimal node acquisition request to the node management server and providing address information of the device in the request;

For example, if the device is in Changsha, the optimal node acquisition request is sent to the node management server, and at least the IP address of the device is included in the request. For example, the IP address of the space location in Changsha, and the IP address is used as the device address information. An IP address is a unified address format provided by the IP protocol which assigns a logical address to each network and each host on the internet, so as to shield the difference in physical addresses.

The node module 320 receives the optimal gateway server being the optimal node for transferring the datagram feed backed by the node management server and determined according to the address information.

Preferably, the optimal gateway server determined by the node management server relative to other gateway servers in the distributed deployment architecture, or a deployment region thereof closer to the terminal, and/or channel transmission quality thereof is optimal among all gateway servers, and/or data connection thereof and the optimal data connection belonging to a same operator, is determined as an optimal node according to the above conditions.

For example, in the foregoing example, after the local access device submits its own IP address to the node management server, the node management server can determine its specific geographical location via the IP address, such as Changsha as described in the foregoing example.

Then, the node management server can determine the optimal gateway server with reference to the conditions shown in Table 2 on the basis of Table 1.

Therefore, when the location of the device determined by the IP address is in Changsha, the location of the optimal gateway server is determined as shown in Table 3.

In the foregoing example, whether the node management server determines that the data connection of the access device and the data connection adopted by the gateway server belong to a same operator depends on whether the access device reports the data connection it uses to the node management server when the optimal node acquisition request is initiated. Therefore, it can be considered optional.

Further, the node management server provides two examples for the calculation of the channel transmission quality. First, the node management server actively tests each gateway server to obtain its respective packet loss rate and round trip time according to the subsequent test unit 330. Second, each business server uses a similar method or means to test the node management server to obtain the packet loss rate and round trip delay, and submits the results to the node management server for storage.

In view of the foregoing, the channel transmission quality is determined according to the transmission quality determined by the round trip delay and the packet loss rate of the test datagram of the transmission channel between the node management server and the gateway server. Thus, the node management server can determine the channel transmission quality of each gateway server by querying the information such as the round trip delay and the packet loss rate of the gateway server corresponding to each business server.

It should be noted that, for the purpose of transmission, the business server needs to register information with the node management server in advance, and the registration information includes a gateway, an IP address (to determine the address information of the client), an access operator, a packet loss rate, and a round trip delay. The calculation of the channel transmission quality is obtained by testing the packet loss rate and round trip delay of each gateway server by the node management server.

According to a preferable embodiment of the present invention, a manner of determining the transmission quality is:

a sum of the round trip delay and the packet loss rate weighted respectively; and in the comparison of a plurality of transmission qualities, the lowest of the sum values is optimal.

The weight score indicates the quantitative distribution of the importance of different aspects of the object to be evaluated in the evaluation process, the role of each evaluation factor in the overall evaluation is treated differently. The weight of an indicator refers to the relative importance of the indicator in the overall evaluation. After determining the system indicators, it is necessary to determine the impact of each indicator in the architecture, i.e. the weight of each indicator.

Certainly, different weight of the round trip delay and the packet loss rate has different effect on the relative importance of different transmission quality evaluation result. For example, the weight of the round trip delay is X ($0<X<1$), the weight of the packet loss rate is Y ($1<Y<100$), and $100X+Y=1$. If the value of $100X/Y$ is large, it means the round trip delay in the evaluation model has more effect on the transmission quality. Otherwise, it means that the packet loss rate is more important for the evaluation of the transmission quality. Certainly, if the value of $100X/Y$ is close to or equal to 1, it means that the evaluation model has relatively high requirements for packet loss rate and round trip delay.

For example, the device terminal address is in Changsha, and the sum of the respectively weighted round trip delay and the packet loss rate is X* round trip delay+Y* packet loss rate. The weighted value of the round trip delay X=0.2 and the weighted value of the packet loss rate Y=80, the weighted sum value is shown in Table 4.

For example, the device terminal address is in Changsha, the sum of the respectively weighted round trip delay and the packet loss rate is X* round trip delay+Y* packet loss rate. The weighted value of the round trip delay X=0.7 and the weighted value of the packet loss rate Y=30, the weighted sum value is shown in Table 5.

In the comparison of the five transmission qualities in Tables 4 and 5, the effect of the packet loss rate on the channel quality is emphasized in Table 4 and the lowest weighted sum of Wuhan is optimal. The effect of the round trip delay on the channel quality is emphasized in Table 5, and the lowest weighted sum of Wuhan is optimal.

It should be noted that, in Table 4 and Table 5, the sum of the respectively weighted round trip delay and the packet loss rate of Wuhan is the lowest and optimal, because the round trip delay and packet loss rate in Wuhan is relatively low, and Wuhan's deployment region is closer to Changsha than other optimal gateway servers adapted to Changsha. In particular, the data connection of the access device and the data connection of the gateway server belong to the same operator (China Mobile).

Certainly, one ordinary skilled in the art should know that this the present embodiment only shows a calculation rule for determining the transmission quality, and there are still other similar or alternative calculation rules. In particularly, in the actual demand, there are other factors affecting the transmission quality, the transmission quality shall be analyzed according to the specific circumstances.

an optimization module 330, configured to test transmission quality of a plurality of accessed data connections to the optimal gateway server, and determine an optimal data connection having optimal transmission quality.

As feedback, the foregoing node management server will feed back the optimal gateway server to the access device. Generally, the node management server only needs to return a single optimal gateway server (returning by IP address). Certainly, it can also return a list of optimal gateway servers, including a number of relatively optimal gateway servers, and then uniformly tested and selected by the access device.

Figure 4:
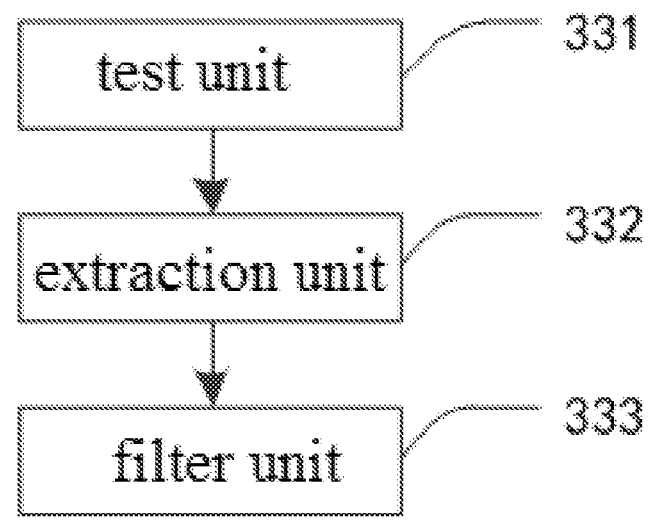
FIG. 4 shows a schematic structural view of an optimization module in one embodiment of the present invention.

The number and form of the optimal gateway server returned by the node management server does not affect the implementation of the present invention. Referring to FIG. 4, for each optimal gateway server recommended by the node management server, the optimization module 330 tests the transmission quality of accessed multi-data connections the access device connected to the optimal gateway server respectively, thereby determining the optimal data connection having the optimal transmission quality. The process includes the following units:

a test unit 331, configured to invoke different data connections have been accessed one by one to send test datagram to the optimal gateway server;

The test data includes a test message. In performing a test, the relevant communication interface is invoked to transmit the test datagram to the optimal network management server via different accessed data connections, to obtain test results of each data connection. The test result at least includes the round trip delay and the packet loss rate.

For example, when the data connection accessed by the access device is a data connection established by the operator of China Mobile, China Telecom, China Unicom or even other operators, the test datagram is respectively sent to the determined optimal gateway server via the data connections, to obtain the test results via the data connection, as shown in Table 6.

As shown in Table 6, it is known that the data connection accessed by the access device is the data connection respectively established by the operator China Mobile, China Unicom and China Telecom, and the test datagram is sent to the determined optimal gateway server via the three data connections, so as to obtain the test result at least including the round trip delay and the packet loss rate. Certainly, the access device may have a number of accessed data connections, which are not limited to the three data connections as listed in Table 6.

It should be noted by one ordinary skilled in the art that the serial numbers in Table 6 are only for the purpose of explanation, and are not actual test sequences.

an extraction unit 332, configured to obtain test result data of each data connection, and extract round trip delay and packet loss rate therein;

The transmission quality evaluation model provided by the present invention utilizes round trip delay (RTT) and packet loss rate as evaluation parameters, so as to ensure that the optimal data connection has the highest video streaming transmission quality to ensure data transmission rate and quality, reduce data retransmission, reduce network load as well as improve the experience of the accessing client users. In the actual network situation, the two-parameter evaluation using the packet loss rate and the round trip delay to evaluate the transmission quality has more accurate evaluation results than single-parameter evaluation using the packet loss rate or the round trip delay alone.

In actual test, there may be more than one test datagram sent by one data connection, so there are multi-data records. That is, there are multiple round trip delays and packet loss rates, and multiple extracted values of round trip delay and packet loss rate. Therefore, choosing a reasonable value is especially critical. Take ping a web address (www.YY.com) for example, as shown in FIG. 6, it can be seen that there is multiple test datagram sent, and multiple RTTs acquired. The figure shows the maximum value, minimum value and mean value of RTT. Certainly, more methods can be used in actual tests to obtain more or more relevant values, this is just an example. For the three different RTTs in FIG. 6, Table 7 shows the reasons of valuing.

As shown in Table 7, when the maximum RTT is taken, the channel transmission quality is extremely poor, and basically will not be selected in actual application. The minimum RRT value indicates that the channel transmission quality is excellent, and the transmission mechanism is maximized, which can meet the experimental expectation. The mean value indicates a reasonable balance of network resources in actual use, which is the preferable choice in test. In addition, in actual use, the probability of occurrence of the maximum value and the minimum value is extremely small, which does not meet the actual requirement. The mean value can reflect a normal state, that is, the mean value is close to the actual measured value and can reduce the error.

a filter unit 333, configured to determine data connection having optimal transmission quality determined by the round trip delay and the packet loss rate as the optimal data connection.

For example, using the weighting calculation rule for the round trip delay and the packet loss rate in node module 320, setting the weighting value of round trip delay and the packet loss rate for evaluating the optimal data connection are X=0.5 and Y=50, respectively. The sum of the round trip delay and the packet loss rate and the weighted sum of the test results are shown in Table 8.

As shown in Table 8, invoking the access device and using the data connection of the operator China Telecom obtains the best measured transmission quality, invoking the access device and using the data connection of the operator China Mobile obtains the better measured transmission quality, invoking the access device and using the data connection of the operator China Unicom obtains the worse measured transmission quality relative to those of China Telecom and China Mobile. Therefore, it is determined that the data connection when the access device uses the operator of China Telecom as the optimal data connection of the access device.

a transmission module 340, configured to invoke the optimal data connection to send a datagram after tunnel encapsulation thereof, and the optimal gateway server forwarding the datagram to a business server connected to the optimal gateway server and belonging to the server cluster.

When a datagram is transmitted between different devices or servers via a network, to transmit the datagram to the destination reliably and accurately, and to efficiently utilize transmission resources (transmission device and transmission lines), the datagram is divided and packaged in advance. To ensure the security and reliability of the data transmission, in the present invention, when the datagram of a certain terminal is transmitted, since the access device has determined the optimal data connection according to the above steps, the optimal data connection may be used for the datagram transmission of the terminal. In order to further improve the security of the data transmission, the datagram is transmitted via tunnel encapsulation and further transmitted to a corresponding business server through the corresponding optimal gateway server.

As shown in FIG. 5, the datagram sent by the terminal is a datagram conformed to TCP or UDP protocol. For example, the video stream generated in live broadcast service needs to respond quickly and ensure the security of the video data transmission. Therefore, the datagram is transmitted under the UDP protocol. In the transmission process, the datagram needs to be encapsulated. After the data arrives, UDP protocol is used to encapsulate the data in the transmission layer and add the UDP header. The encapsulated UDP data is transmitted to the network layer, the network layer is encapsulated and added IP header according to the IP protocol. In decapsulating, when the data is transmitted from network layer to the transport layer, network layer decapsulation using IP protocol is carried out and the IP header is removed. After being transmitted from the transport layer to the terminal, UDP protocol is used to decapsulate the data and removes the UDP header.

Certainly, the above description is only a single tunnel for the optimal data connection transmission of one terminal datagram. When other terminals access, the receive module 310, the node module 320, the optimization module 330 and the transmission module 340 or other modules or units of the access device will determine the optimal data connection for each terminal and performs a multi-tunnel transmission.

According to a preferable embodiment of the present invention, each gateway server is connected to a business server of a server cluster providing the remote service, so that the tunnel encapsulated datagram reaches the business server connected thereto through the optimal gateway server.

For example, it can be seen from the above steps or examples of the modules or units, after the transmission module 340 determines the optimal data connection and performs tunnel encapsulation, the optimal gateway server of the server cluster providing the remote service is in Wuhan, and the optimal gateway server is connected to a business server with optimal data connection determined by the transmission module 340 and associated with the optimal gateway server, so that the datagram related to the remote service request arrives at the business server via the optimal gateway server after the tunnel decapsulation.

The transmission module 340 is further configured to receive, by the business server, the datagram forwarded by the optimal gateway server and fed back by the optimal data connection;

Specifically, after receiving the datagram tunnel encapsulated by the access device, the business server tunnel decapsulates the datagram, parses the datagram, responds to the datagram, and feeds back another tunnel decapsulated datagram. The tunnel decapsulated datagram fed back by the business server will be reversed via the optimal gateway server, and fed back to the access device via the optimal data connection for forwarding to a corresponding user terminal.

Then, the access device can tunnel decapsulates the datagram that is tunnel encapsulated by the business server, and send the tunnel decapsulated datagram to the terminal.

After the processing of receive module 310, node module 320, optimization module 330 and transmission module 340, the terminal requests the remote service, the datagram after the tunnel encapsulation is sent to the business server to be tunnel decapsulated, the business server returns the datagram and performs tunnel encapsulation. After arriving at the terminal, the datagram is tunnel decapsulated.

For example, the terminal is in Changsha, and the optimal gateway server is in Wuhan. When the business server connected to the optimal gateway server in the optimal data connection receives the datagram of the terminal tunnel encapsulation (remote service request) and performs tunnel decapsulation process. After providing the remote service, the datagram is optimally connected and tunnel encapsulated, and further transmitted to the terminal in Changsha by the optimal gateway server in Wuhan. After arriving at the terminal, tunnel decapsulation process of the datagram is performed.

Detailed description of the foregoing embodiment of the multi-data connection access device can refer to the description in the embodiment of the method for controlling a remote service access path, which is not described again herein.

The multi-data connection access device and the method for controlling a remote service access path of the present invention can facilitates the user to access data connections of different operators, thereby providing a one-stop solution for the terminal connected to the device to access the remote service.

In summary, the entire technical solution of the present invention can be implemented on a single end, which can provide users with independent terminal access devices, so that the efficiency and security of users accessing specific remote services can be improved greatly.

What is claimed is:

1. A method for controlling a remote service access path, comprising the steps of:
 receiving a datagram sent by any terminal intending to access the remote service;
 requesting a node management server to determine an optimal gateway server as an optimal node for transferring the datagram, the optimal gateway server being selected from a plurality of gateway servers provided for a distributed deployment architecture established for a server cluster of the remote service;
 testing transmission quality of a plurality of accessed data connections to the optimal gateway server, and determining an optimal data connection having optimal transmission quality; and
 invoking the optimal data connection to send a datagram after tunnel encapsulation thereof, the optimal gateway server forwarding the datagram to a business server connected to the optimal gateway server and belonging to the server cluster,
 wherein the optimal gateway server determined by the node management server relative to other gateway servers in the distributed deployment architecture, or a deployment region thereof closer to the terminal, and/ or channel transmission quality thereof is optimal among all gateway servers, and/or data connection thereof and the optimal data connection belonging to a same operator, is determined as an optimal node according to the above conditions, and wherein a channel transmission quality is determined according to the transmission quality determined by a round trip delay and a packet loss rate of a test packet of a transmission channel between the node management server and the gateway server.

2. The method for controlling a remote service access path of claim 1, after the step of invoking the optimal data connection to send a datagram after tunnel encapsulation thereof, and the optimal gateway server forwarding the datagram to a business server connected to the optimal gateway server and belonging to the server cluster, the method further comprises the steps of:
receiving the datagram forwarded by the business server via the optimal gateway server and fed back by the optimal data connection;
tunnel decapsulating the datagram tunnel encapsulated by the business server, and sending the tunnel decapsulated datagram to the terminal.

3. The method for controlling a remote service access path of claim 2, wherein the step of requesting a node management server to determine an optimal gateway server as an optimal node for transferring the datagram comprising the steps of:
sending an optimal node acquisition request to the node management server, and providing address information of the device in the request; and
receiving the optimal gateway server being the optimal node for transferring the datagram feed backed by the node management server and determined according to the address information.

4. The method for controlling a remote service access path of claim 1, wherein the step of testing transmission quality of a plurality of accessed data connections to the optimal gateway server, and determining an optimal data connection having optimal transmission quality comprises the steps of:
invoking different data connections have been accessed one by one to send test datagram to the optimal gateway server;
obtaining test result data of each data connection, and extracting round trip delay and packet loss rate therein; and
determining data connection having optimal transmission quality determined by the round trip delay and the packet loss rate as the optimal data connection.

5. The method for controlling a remote service access path of claim 1, wherein each gateway server is connected to a business server of the server cluster providing the remote service, so that the datagram after tunnel encapsulation, via the optimal gateway server, arrives at the business server connected to the optimal gateway server.

6. The method for controlling a remote service access path of claim 4, wherein a manner of determining the transmission quality is:
a sum of the round trip delay and the packet loss rate weighted respectively; and
in the comparison of a plurality of transmission qualities, the lowest of the sum values is optimal.

7. The method for controlling a remote service access path of claim 5, wherein a manner of determining the transmission quality is:
a sum of the round trip delay and the packet loss rate weighted respectively; and
in the comparison of a plurality of transmission qualities, the lowest of the sum values is optimal.

8. The method for controlling a remote service access path of claim 1, wherein the datagram is a datagram conformed to a TCP or UDP protocol, and the tunnel encapsulation and the tunnel decapsulation are both performed based on the UDP protocol.

9. A multi-data connection access device, comprising one or more processors and a storage device configured for storing one or more programs, wherein when the one or more programs are executed by the one or more processors, the one or more processors implement a method for controlling a remote service comprising the steps of:
receiving a datagram sent by any terminal intending to access a remote service;
requesting a node management server to determine an optimal gateway server as an optimal node for transferring the datagram, the optimal gateway server being selected from a plurality of gateway servers provided for a distributed deployment architecture established for a server cluster of the remote service;
testing transmission quality of a plurality of accessed data connections to the optimal gateway server, and determine an optimal data connection having optimal transmission quality;
invoking the optimal data connection to send a datagram after tunnel encapsulation thereof, the optimal gateway server forwarding the datagram to a business server connected to the optimal gateway server and belonging to the server cluster,
wherein the optimal gateway server determined by the node management server relative to other gateway servers in the distributed deployment architecture, or a deployment region thereof closer to the terminal, and/or channel transmission quality thereof is optimal among all gateway servers, and/or data connection thereof and the optimal data connection belonging to a same operator, is determined as an optimal node according to the above conditions, and
wherein a channel transmission quality is determined according to the transmission quality determined by a round trip delay and a packet loss rate of a test packet of a transmission channel between the node management server and the gateway server.

* * * * *